Patented Mar. 28, 1944

2,345,099

UNITED STATES PATENT OFFICE 2,345,099

PROCESS FOR TREATING FISH LIVERS

Loran O. Buxton, Belleville, N. J., assignor to National Oil Products Company, Harrison, N. J., a corporation of New Jersey No Drawing. Application July 26, 1941, Serial No. 404,157

8 Claims. (Cl. 260—412.1)

This invention relates to the treatment of fish livers, more particularly to the treatment of fish livers to remove the oil and vitamin content therefrom.

It is well known that fish livers contain relatively large quantities of the valuable vitamins A and D. Various processes have been proposed for obtaining the vitamin-bearing oils contained in fish livers. One of the most common of such methods is steam digestion. This process, which is usually carried out at temperatures of about 100° C. or higher, has several disadvantages, the main disadvantage being that at such temperatures a substantial portion of the vitamin A in the oil is destroyed. Moreover, the conditions under which said process is carried out are very favorable for the action of various lipolytic enzymes, which split the oil into glycerol and free fatty acids. The high temperatures used usually deactivate these enzymes, but in heating the liver mass to the desired temperature the enzymes have ample opportunity to act upon the oil before they are deactivated. Another disadvantage of this cooking is that it tends to make the proteins of the liver oil-soluble and thus darken and discolor the oil. The free fatty acids and oil-soluble protein substances which are produced by such processes decrease the value of and complicate the refining of the recovered oil.

It has also been proposed to remove the oil from fish livers by treating crushed or pulped fish livers with glacial acetic acid and anhydrous sodium sulphate, heating the mass to above 70° C. to coagulate the liver protein and permit separation of the oil, and then mechanically removing the supernatant oil which separates from the mass. This process has several disadvantages, among them being that it is somewhat inefficient as regards the recovery of the oil and the vitamins contained therein and in the liver tissue, and thus a substantial portion of valuble constituents remains in the liver mass and is a total loss to the processor. Also the use of reagents such as anhydrous sodium sulphate in the amounts in which they are used makes the cost of the process comparatively high.

It is the object of this invention to provide an improved process for the treatment of fish livers to remove the vitamin-bearing oils contained therein.

Another object of this invention is to provide a process for the production of fish liver oils containing relatively larger amounts of natural antioxidants than heretofore.

Other objects of the invention will in part be obvious and will in part appear hereinafter.

I have now discovered that the foregoing and other objects of the invention may be realized by subjecting raw fish livers to the combined action of a water-miscible lower aliphatic acid, particularly acetic acid, and an organic solvent for the liver oil. The oil-solvent-acid mixture is removed from the treated mass and the oil freed of solvent and acid. A high quality vitamin-containing fish liver oil is thus obtained. The acid penetrates into the liver tissues carrying with it the organic solvent. Thus the efficiency of the solvent is greatly increased and much better yields of oil and vitamins are obtained than when using other processes. If desired, the acid may be added to the livers, and the livers given a preliminary treatment therewith, after which the solvent is added and the livers then subjected to the combined action of the acid-solvent mixture. Of course, the livers may be treated directly with the acid-solvent mixture without any preliminary treatment with the acid alone. The livers are preferably comminuted before being treated as the extraction will thus be somewhat more efficient.

Any vitamin A and/or D-containing fish livers may be rendered according to the process of this invention, including, among others, livers of halibut, mackerel, sword fish, tuna, ling cod, jewfish, whale, etc. It is preferred to grind, chop or otherwise macerate the livers before treating them as the time of treatment may thus be diminished since the acid and solvent will come into more intimate contact with the liver cells. The term "comminuted fish livers" is used herein to connote ground, chopped or otherwise macerated fish livers.

In carrying out the process of the invention, the comminuted livers are contacted with the water-miscible lower aliphatic acid or the acid-solvent mixture for a period of time and at a temperature which will effect an optimum liberation of oil. In practice it has been found that the action of the acid on the liver tissue is quite efficient within the temperature range of 50° C. to 60° C. It is to be understood, however, that the invention is not to be limited to this range as lower or higher temperatures may be maintained during this step. While the use of acetic acid is highly preferred in practicing the process of the invention, other water-miscible lower aliphatic acids may be used alone or in admixture with acetic acid. Such acids include, inter alia, lactic, citric, propionic, formic and similar acids which all fall within the generic expression "water-miscible lower aliphatic acids." These acids may be either liquid or solid. In the event that a solid acid is used it will be dissolved in the juices or water usually associated with fish livers. The time required for the treatment of the livers will vary depending upon the degree of comminution of the livers, the acid used, the temperature maintained and the type of livers treated. In using acetic acid the oil is usually completely liberated in about two to three hours when a temperature of 50° C. to 60° C. is maintained.

After the livers have been comminuted and thoroughly treated with the acid and solvent, the oil-solvent-acid mixture is removed from the treated mass and any oil remaining in the livers is then removed either mechanically or by solvent extraction. If the oil is removed mechanically, it may be removed in any of a number of ways, such as mechanical extraction or pressing out, or by centrifugation, etc. It is preferred, however, to solvent extract the livers, especially when the livers contain only relatively small percentages of oil, since usually higher yields will result. The solvent employed for extracting the livers after the acid treatment may be acidified or not depending upon the degree of oil liberated during the initial step in the process.

Suitable solvents for treating the livers and for extracting the oil from them after treatment include, among others, ethylene dichloride, trichloroethylene, hexane, dichloroethylether, ethyl ether, chloroform, acetone, petroleum ether, cyclohexane, methyl cyclohexane, etc., the first three solvents named being highly preferred. Compatible mixtures of these and/or other suitable solvents may also be used. The ratio of acid to solvent may vary depending upon the type of livers, the acid used, the temperature at which the treatment is carried out, the length of time of treatment, etc. Usually it is preferred to use a solvent containing from five to ten percent of acid. However, solvents containing as much as twenty percent, or as little as two percent of acid, may well be used to effect the purposes of the invention.

After removing the oil from the liver mass, the acid may be removed from the oil either by washing the oil with water or by distillation under vacuum. The solvent may be removed in any suitable way, such as, for example, by vacuum distillation under an atmosphere of nitrogen.

For a fuller understanding of the nature and objects of the invention, reference should be had to the following examples which are given merely to further illustrate the invention and are not to be construed in a limiting sense, all parts given being by weight.

Example I 200 parts of tuna livers were ground to a fine pulp and 100 parts of glacial acetic acid were added. The mixture was placed in a closed vessel and kept at 60° C. for 3 hours. 800 parts of ethylene dichloride were then added and the mass heated for 10 minutes. The solvent was removed and a fresh batch of ethylene dichloride was added. The mixture was again heated for 10 minutes. A total of four extractions were conducted, and the combined extracts were then filtered and the acetic acid removed by washing with water. The solvent was removed from the oil and an oil was obtained having a vitamin A potency of 78,400 units of vitamin A per gram. The yield of oil was 22.8% based on the weight of the livers as compared to a yield of 19% for similar livers processed by the steam digestion method. Also the oil obtained by the steam digestion method was lower in vitamin A potency than the oil produced by the process of the invention. Approximately 25% higher yield of vitamin A was obtained with the present process than with the steam digestion process.

Example II 500 parts of macerated mackerel livers were mixed with 2000 parts of acetone containing 5% glacial acetic acid and the mixture heated at about 50° C. in an inert atmosphere for one hour. The solvent was removed and a fresh batch of acidified (5% glacial acetic acid) acetone was added. The mixture was again heated for 15 minutes. A total of three extractions was conducted and the combined extracts were filtered and the solvent removed under reduced pressure in an inert atmosphere of $N_2$ gas. The yield of oil was 7.3% as compared to a yield of 6.0% for similar livers processed by the steam digestion process.

The advantages of the process of this invention are that the organic acid has a penetrating effect on the liver cells, thus accomplishing an efficient release of the oil. Moreover the solvent is carried into the lever cells by the acid, whereby the extraction with solvent is more efficient than if the lever is extracted with the solvent alone. Another advantage of the solvent-acid treatment is that the degree of extraction of natural antioxidants in the liver is greatly enhanced, and thus the vitamin-bearing oil which is obtained is more stable to oxidation than oils produced by the prior known methods. A further advantage of this process is that the various enzymes in the liver which tend to act upon the oils to split the triglycerides into glycerol and free fatty acids are deactivated by the acid before they have an opportunity to hydrolyze the oil; thus the oils which are produced by the present process are lower in free fatty acid content than oils produced by steam digestion methods, and consequently are more readily refined. Still another advantage of this process is that the liver mass which remains after the removal of the oil presents a valuable potential source of the vitamin B factors. In ordinary steam digestion methods alkalis are occasionally added to aid in coagulating the liver proteins and also to retard the action of the lipolytic enzymes in the lever. However, such alkali tends to inactivate the vitamin B factors contained in the liver, and the liver mass which remains after the extraction of the oil is of little value except for use as a fertilizer.

Since certain changes may be made in carrying out the above process without departing from the scope of the invention, it is intended that all matter contained in the above description shall be interpreted as illustrative and not in a limiting sense.

Having described my invention what I claim as new and desire to secure by Letters Patent is:

1. In a process of removing oil from raw fish livers, the step which comprises conjointly treating the livers with a mixture of an organic solvent for the oil and a water-miscible lower aliphatic acid.

2. In a process of removing oil from raw fish livers, the step which comprises conjointly treating the livers with a mixture of an organic solvent for the oil and acetic acid.

3. In a process of removing oil from raw fish livers, the step which comprises conjointly treating the livers with a mixture of ethylene dichloride and acetic acid.

4. A process of removing oil from fish livers which comprises subjecting comminuted raw fish livers to the conjoint action of the water-miscible lower aliphatic acid and an organic solvent for the oil at an elevated temperature and removing the oil thus liberated.

5. A process of removing oil from fish livers which comprises subjecting comminuted raw fish livers to the conjoint action of acetic acid and an organic solvent for the oil at an elevated temperature and removing the oil thus liberated.

6. A process of removing oil from fish livers which comprises subjecting comminuted fish livers to the conjoint action of a water-miscible lower aliphatic acid and an organic solvent for the oil at an elevated temperature and removing the liberated oil from the mass by extraction with an acidified solvent for the oil.

7. A process of removing oil from fish livers which comprises subjecting comminuted fish livers to the conjoint action of acetic acid and an organic solvent for the oil at an elevated temperature and removing the liberated oil from the mass by extraction with an acidified solvent for the oil.

8. A process of removing oil from fish livers which comprises subjecting comminuted raw fish livers to the conjoint action of acetic acid and ethylene dichloride at an elevated temperature and removing the oil thus liberated.

LORAN O. BUXTON.